(12) United States Patent
Thomas et al.

(10) Patent No.: US 9,944,769 B2
(45) Date of Patent: Apr. 17, 2018

(54) UREA-DERIVED PRODUCTS AND METHODS FOR MAKING SAME

(71) Applicant: The Procter & Gamble Company, Cincinnati, OH (US)

(72) Inventors: Jacqueline Besinaiz Thomas, Oregonia, OH (US); Stephen Wayne Heinzman, Cincinnati, OH (US); Gregory Charles Gordon, Loveland, OH (US); James Cyrus Winchester, III, Monroe, NC (US); Roy Lee Oakley, Jr., Sandy Ridge, NC (US)

(73) Assignee: The Procter & Gamble Company, Cincinnati, OH (US)

( * ) Notice: Subject to any disclaimer, the term of this patent is extended or adjusted under 35 U.S.C. 154(b) by 554 days.

(21) Appl. No.: 13/661,076

(22) Filed: Oct. 26, 2012

(65) Prior Publication Data

US 2014/0117274 A1 May 1, 2014

(51) Int. Cl.
*C07C 275/10* (2006.01)
*C08K 5/21* (2006.01)
*D06M 13/432* (2006.01)

(52) U.S. Cl.
CPC ............. *C08K 5/21* (2013.01); *D06M 13/432* (2013.01)

(58) Field of Classification Search
CPC ........................................................ C08K 5/21
See application file for complete search history.

(56) References Cited

U.S. PATENT DOCUMENTS

| | | | | |
|---|---|---|---|---|
| 4,295,846 A | * | 10/1981 | Petersen et al. | ......... 8/186 |
| 5,110,944 A | | 5/1992 | Yamada et al. | |
| 6,103,898 A | | 8/2000 | Kramer et al. | |
| 2008/0216979 A1 | | 9/2008 | Schaffer | |
| 2010/0010233 A1 | * | 1/2010 | Nishino | ...... C07D 233/74 548/317.1 |

OTHER PUBLICATIONS

PCT International Search Report, U.S. Appl. No. 13/661,076 dated Feb. 11, 2014.

* cited by examiner

*Primary Examiner* — Peter F Godenschwager
(74) *Attorney, Agent, or Firm* — C. Brant Cook

(57) ABSTRACT

Urea-derived products, for example liquid compositions containing urea-derived compounds, such as dihydroxyethyleneurea ("DHEU"), and methods for making same are provided.

9 Claims, No Drawings

UREA-DERIVED PRODUCTS AND METHODS FOR MAKING SAME

FIELD OF THE INVENTION

The present invention relates to urea-derived products, for example liquid compositions comprising urea-derived compounds, such as dihydroxyethyleneurea ("DHEU"), and methods for making same. More particularly, the present invention relates to liquid compositions comprising DHEU and less than 4000 ppm of glycoluril including glycoluril derivatives and/or less than 2% on weight of DHEU of glycoluril including glycoluril derivatives as measured according to the HPLC Test Method described herein, and methods for making same.

BACKGROUND OF THE INVENTION

Traditionally urea-derived products such as liquid compositions comprising DHEU, for example aqueous compositions, were produced by reacting solid urea with a solution of glyoxal to form a liquid composition comprising DHEU. The resulting liquid composition comprising DHEU also contained unreacted urea and/or urea derivatives and/or unreacted glyoxal and/or glyoxal derivatives and glycoluril, a byproduct of urea, for example excess urea, reacting with DHEU and/or glycoluril derivatives. These known liquid compositions comprising DHEU contained significant amounts of glycoluril, which is an undesired byproduct of the reaction for certain uses of the liquid composition, for example when it is used as a crosslinking agent in the formation of a hydroxyl polymer filament. The known liquid compositions described above contained much greater than 4000 ppm, for example 5000-6000 ppm, of glycoluril including any glycoluril derivatives and/or much greater than 2% on weight of DHEU of glycoluril including any glycoluril derivatives.

One approach that formulators have taken to reduce the level of glycoluril including glycoluril derivatives in the liquid compositions comprising DHEU is to crystallize the DHEU. The crystallization of the DHEU from the liquid composition comprising the DHEU, urea, and glycoluril including any glycoluril derivatives results in a pure solid DHEU. This pure solid DHEU may then be dissolved to form a liquid composition comprising DHEU and no or no detectable level of glycoluril nor glycoluril derivatives, and no or no detectable level of urea nor urea derivatives (thus glycoluril including glycoluril derivatives and urea and urea derivatives have been eliminated from this liquid composition comprising DHEU). However, the crystallization/purification process has its negatives, for example it is difficult to obtain yields of greater than 50% by weight of DHEU from the original reactants. One problem faced by formulators of liquid compositions comprising DHEU is how to produce a liquid composition comprising DHEU, with or without urea, and with less glycoluril including glycoluril derivatives than known liquid compositions comprising DHEU with minimal steps, for example without crystallizing and/or purifying the DHEU from the other components in the liquid composition comprising DHEU and/or without significant yield loss of the DHEU.

Accordingly, there is a need for liquid compositions comprising DHEU, with or without urea and/or urea derivatives, and minimal (less than 4000 ppm and/or less than 2% on weight of DHEU) to no or no-detectable level glycoluril including glycoluril derivatives and methods for making such liquid compositions.

SUMMARY OF THE INVENTION

The present invention fulfills the need described above by providing liquid compositions comprising DHEU, with or without urea and/or urea derivatives, which contain less glycoluril including glycoluril derivatives than known DHEU liquid compositions.

A solution to the problem described above is a liquid composition comprising DHEU, with or without urea and/or urea derivatives, and less than 4000 ppm of glycoluril including glycoluril derivatives and/or less than 2% on weight of DHEU of glycoluril including glycoluril derivatives as measured according to the HPLC Test Method described herein.

In one example of the present invention, a liquid composition, for example an aqueous composition, comprising DHEU, with or without urea and/or urea derivatives, and less than 4000 ppm of glycoluril including glycoluril derivatives as measured according to the HPLC Test Method described herein is provided.

In another example of the present invention, a liquid composition, for example an aqueous composition, comprising DHEU, urea and/or urea derivatives, and less than 4000 ppm of glycoluril including glycoluril derivatives as measured according to the HPLC Test Method described herein is provided.

In another example of the present invention, a liquid composition, for example an aqueous composition, comprising DHEU and a detectable level of less than 4000 ppm of glycoluril including glycoluril derivatives as measured according to the HPLC Test Method described herein is provided.

In still another example, a liquid composition, for example an aqueous composition, comprising DHEU, with or without urea and/or urea derivatives, and less than 2% on weight of DHEU of glycoluril including glycoluril derivatives as measured according to the HPLC Test Method described herein is provided.

In even another example of the present invention, a liquid composition, for example an aqueous composition, comprising DHEU, urea, and less than 2% on weight of DHEU of glycoluril including glycoluril derivatives as measured according to the HPLC Test Method described herein is provided.

In another example of the present invention, a liquid composition, for example an aqueous composition, comprising DHEU and a detectable level of less than 2% on weight of DHEU of glycoluril including glycoluril derivatives as measured according to the HPLC Test Method described herein is provided.

In still yet another example, a liquid composition, for example an aqueous composition, comprising DHEU, with or without urea and/or urea derivatives, and greater than 0 ppm to less than 4000 ppm of glycoluril including glycoluril derivatives as measured according to the HPLC Test Method described herein is provided.

In another example of the present invention, a liquid composition, for example an aqueous composition, comprising DHEU, urea and/or urea derivatives, and greater than 0 ppm to less than 4000 ppm of glycoluril including glycoluril derivatives as measured according to the HPLC Test Method described herein is provided.

In another example of the present invention, a liquid composition, for example an aqueous composition, comprising DHEU and greater than 0 ppm to less than 4000 ppm of glycoluril including glycoluril derivatives as measured according to the HPLC Test Method described herein is provided.

In yet another example, a liquid composition, for example an aqueous composition, comprising DHEU, with or without urea and/or urea derivatives, and greater than 0% to less than 2% on weight of DHEU of glycoluril including glycoluril derivatives as measured according to the HPLC Test Method described herein is provided.

In even another example of the present invention, a liquid composition, for example an aqueous composition, comprising DHEU, urea and/or urea derivatives, and greater than 0% to less than 2% on weight of DHEU of glycoluril including glycoluril derivatives as measured according to the HPLC Test Method described herein is provided.

In another example of the present invention, a liquid composition, for example an aqueous composition, comprising DHEU and greater than 0% to less than 2% on weight of DHEU of glycoluril including glycoluril derivatives as measured according to the HPLC Test Method described herein is provided.

In even yet another example, a method for producing a liquid composition, for example an aqueous composition, wherein the method comprises the steps of:

a. providing a urea solution, for example an aqueous solution of urea;

b. providing a glyoxal solution, for example an aqueous solution of glyoxal; and c. reacting the urea solution with the glyoxal solution to produce a liquid composition comprising DHEU, and optionally urea and/or urea derivatives and/or glyoxal and/or glyoxal derivatives and/or glycoluril including any glycoluril derivative, is provided.

Accordingly, the present invention provides a liquid composition comprising DHEU, with or without urea and/or urea derivatives, and less than 4000 ppm of glycoluril including glycoluril derivatives and/or less than 2% on weight of DHEU of glycoluril including glycoluril derivatives as measured by the HPLC Test Method described herein and methods for making same.

DETAILED DESCRIPTION OF THE INVENTION

Definitions
Urea
"Urea" as used herein means a compound having the following formula:

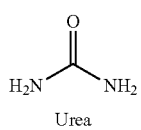
Urea

The urea may be in solid form or solution form. In one example, the urea is in the form of a solution, such as an aqueous solution. In another example, the urea is present in a solution, for example an aqueous solution, at a level of greater than 0% and/or greater than 5% and/or greater than 10% and/or greater than 20% and/or greater than 30% and/or greater than 35% to about 50% and/or to about 45% and/or to about 40% by weight of the solution. In another example, the urea is present in a solution, for example an aqueous solution, at a level of greater than 0% to about 50% and/or greater than 5% to about 45% and/or from greater than 10% to about 40% by weight of the solution.

In one example, urea derivatives, such as N,N-dimethyl urea, may be used in place of or in addition to urea.

Glyoxal
"Glyoxal" as used herein means a compound having the following formula:

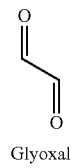
Glyoxal

In one example, the glyoxal is the form of a solution, for example an aqueous solution. In another example, the glyoxal is present in a solution, for example an aqueous solution, at a level of greater than 0% and/or greater than 5% and/or greater than 10% and/or greater than 20% and/or greater than 30% and/or greater than 35% to about 50% and/or to about 45% and/or to about 40% by weight of the solution. In another example, the glyoxal is present in a solution, for example an aqueous solution, at a level of greater than 0% to about 50% and/or greater than 5% to about 45% and/or from greater than 10% to about 40% by weight of the solution.

In one example, glyoxal derivatives may be used in place of or in addition to glyoxal.

DHEU
"DHEU" as used herein means a compound having the following formula:

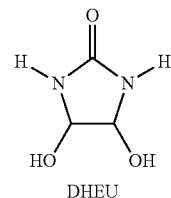
DHEU

DHEU may comprise trans and cis isomers as shown in the formulas below:

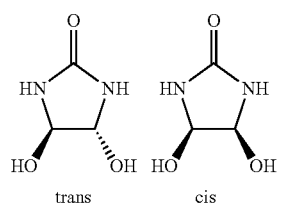
trans    cis

In one example, DHEU is produced by the following reaction:

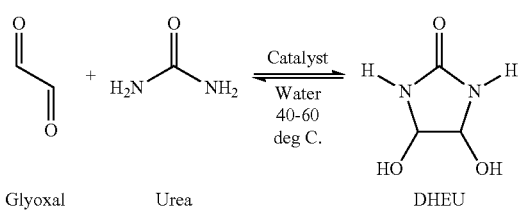

Glycoluril

"Glycoluril" as used herein means the byproduct of the reaction of DHEU with urea, such as excess urea. Glycoluril is a compound having the following formula:

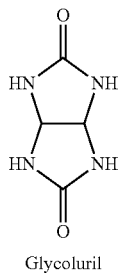

Glycoluril

In one example, glycoluril is produced in the liquid compositions of the present invention which comprise DHEU by the following reaction.

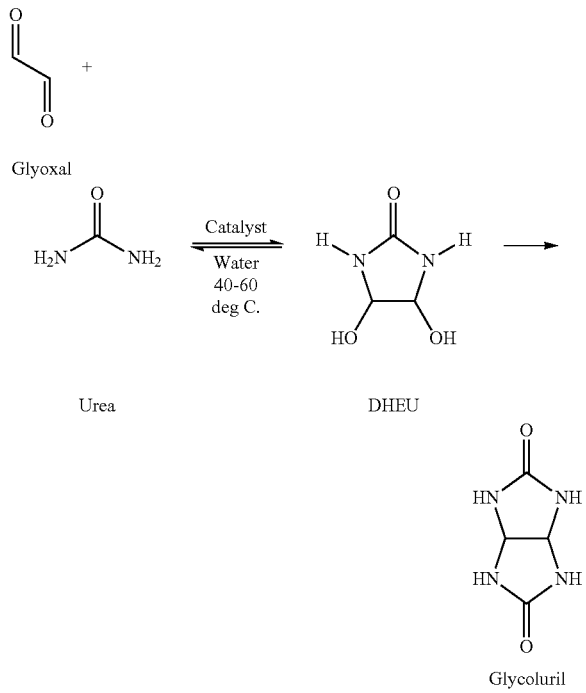

If a derivative of urea and/or glyoxal are used, a DHEU derivative and/or a glycoluril derivative, such as 1,3,4,6-tetramethyl glycoluril may be produced.

"Aqueous composition" and/or "aqueous solution" as used herein means a composition or solution comprising water, for example greater than 5% and/or greater than 10% and/or greater than 20% and/or greater than 40% and/or greater than 50% and/or greater than 60% and/or to about 100% and/or to about 95% and/or to about 90% and/or to about 80% and/or to about 70% and/or to about 65% by weight of the composition or solution of water. In one example, the water may be tap water, distilled water and/or deionized water.

"Derivative" as used herein with respect to, for example, urea derivative, means a compound that is derived from a similar compound (in this case urea) by some chemical or physical process.

"Pressure" as used herein refers to standard atmosphere (atm). Standard atmosphere (atm) is equal to 101325 Pascals (Pa).

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Liquid Compositions

The liquid compositions of the present invention may be aqueous compositions. The liquid compositions of the present invention comprise DHEU. In one example, the liquid compositions of the present invention comprise greater than 0% and/or greater than 5% and/or greater than 10% and/or greater than 20% and/or greater than 25% and/or greater than 30% and/or up to about 50% and/or up to about 45% and/or up to about 40% by weight of DHEU as measured according to the HPLC Test Method described herein. In another example, the liquid compositions of the present invention comprise from about 10% to about 50% and/or from about 20% to about 40% by weight of DHEU as measured according to the HPLC Test Method described herein.

The liquid compositions of the present invention may exhibit a pH of greater than 5 and/or greater than 5.2 and/or greater than 5.5 and/or greater than 5.7 and/or less than 8 and/or less than 7.7 and/or less than 7.5 and/or less than 7.2 and/or less than 7 and/or less than 7 greater than 5 to less than 7.5 and/or from about 5.5 to about 6.8. In one example, the liquid compositions of the present invention exhibit a pH of from about 5.2 to about 7 and/or from about 5.4 to about 6.4. In one example, the liquid compositions of the present invention exhibit a pH of less than 8. In another example, the liquid compositions of the present invention exhibit a pH of greater than 5.

In addition to the DHEU, the liquid compositions of the present invention may comprise urea, such as unreacted urea (i.e., excess urea) and/or urea derivatives, glyoxal, such as unreacted glyoxal, and/or glyoxal derivatives, and glycoluril including any glycoluril derivatives.

In one example, the liquid compositions of the present invention comprise less than 20% and/or less than 10% and/or less than 5% and/or less than 2% and/or to about 0.1% and/or to about 0.05% and/or greater than 0% by weight of urea and/or urea derivative as measured according to the $^1$H NMR Test Method described herein.

In another example, the liquid compositions of the present invention comprise less than 10% and/or less than 8% and/or less than 5% and/or less than 3% and/or greater than 2% on weight of DHEU of urea and/or urea derivative as measured according to the $^1$H NMR Test Method described herein.

In still another example, the liquid compositions of the present invention comprise less than 1500 ppm and/or less than 1000 ppm and/or less than 750 ppm and/or less than 500 ppm and/or less than 250 ppm and/or less than 100 ppm and/or to about 0 ppm of glyoxal or glyoxal derivative as measured according to the HPLC Test Method described herein.

In another example, the aqueous solution of the present invention comprise less than 4000 ppm and/or less than 3000 ppm and/or less than 2000 ppm and/or less than 1000 ppm and/or less than 500 ppm and/or less than 400 ppm and/or less than 300 ppm and/or less than 200 ppm and/or less than 100 ppm and/or to about 0 ppm of glycoluril including glycoluril derivatives as measured according to the HPLC Test Method described herein.

In another example, the liquid compositions of the present invention comprise less than 2% and/or less than 1% and/or less than 0.1% and/or less than 0.05% and/or greater than 0% on weight of DHEU of glycoluril including glycoluril derivatives as measured according to the HPLC Test Method described herein.

The liquid compositions of the present invention may comprise one or more pH adjusting agent and/or buffering agents, which may be added to the liquid composition before, during, and/or after DHEU production. Non-limiting examples of suitable pH adjusting agents and/or buffering agents include buffers made from amines, such as triethanolamine (TEA), inorganic bases, for example hydroxides, such as sodium hydroxide, potassium hydroxide, phosphates, such as sodium phosphate, bicarbonates, such as sodium bicarbonate, carbonates, such as calcium carbonate, citric acid, ion exchange resins that adjust pH, such as poly(acrylamido-N-propyltrimethylammonium chloride) (PolyAPTAC) and polyethylene amine, and any compounds, including Good buffers and biological buffering agents that result in the liquid compositions comprising DHEU maintaining a pH in the range of about 6.0 to about 7.5.

Method for Making Liquid Compositions

The liquid compositions comprising DHEU of the present invention may be made by any suitable process known in the art so long as the resulting liquid compositions comprise DHEU and less than 4000 ppm of glycoluril including glycoluril derivatives and/or less than 2% on weight of DHEU of glycoluril including glycoluril derivatives as measured according to the HPLC Test Method described herein.

In one example, a liquid composition of the present invention is made by reacting urea and/or a urea derivative in solid form with a solution of glyoxal and/or a solution of glyoxal derivative to form a liquid composition comprising DHEU, urea and/or urea derivative and/or glyoxal and/or glyoxal derivative.

The urea and/or urea derivative and glyoxal and/or glyoxal derivative may be present in the reaction at any suitable level, for example at levels such that the molar ratio of urea and/or urea derivative to glyoxal and/or glyoxal derivative is greater than 0.8:1 and/or greater than 0.9:1 and/or greater than 1:1 and/or greater than 1.05:1 and/or greater than 1.1:1 and/or less than 2:1 and/or less than 1.7:1 and/or less than 1.5:1. In one example, the molar ratio of urea and/or urea derivative to glyoxal and/or glyoxal derivative is from about 1.1:1 to about 1.3:1.

At any point in the methods of the present invention, a buffering agent (for example a pH adjusting agent), such as a base, may be added to the liquid composition to result in the liquid composition of the present invention, in one example, exhibiting a pH of greater than 5 to less than 8 and/or from about 5.2 to about 7 and/or from about 5.5 to about 6.4.

In one example of the present invention, a method for making a liquid composition comprising DHEU comprises the steps of:
  a. providing a urea solution, for example an aqueous solution of urea, for example a greater than 0% to 50% solution of urea;
  b. providing a glyoxal solution, for example an aqueous solution of glyoxal, for example a greater than 0% to 50% solution of glyoxal; and
  c. reacting the urea solution with the glyoxal solution to produce a liquid composition comprising DHEU, and unreacted urea and/or urea derivatives and/or unreacted glyoxal and/or glyoxal derivatives.

In one example, the urea solution (solution of urea) comprises greater than 0.001% and/or greater than 0.005% and/or greater than 0.01% on weight of DHEU of urea.

The reaction of the urea solution with the glyoxal solution may occur at a temperature of greater than 40° C. and/or greater than 50° C. and/or greater than 55° C. and/or up to 100° C. and/or up to 90° C. and/or up to 80° C. and/or up to 70° C. and/or from about 40° C. to about 100° C. and/or from about 50° C. to about 90° C. and/or from about 55° C. to about 80° C. and/or from about 55° C. to about 70° C. and/or from about 60° C. to about 65° C. In one example, the reaction of the urea solution with the glyoxal solution occurs at a temperature of from about 40° C. to about 70° C. and/or from about 50° C. to about 65° C.

The reaction time of the urea solution with the glyoxal solution at the reaction temperature, examples of which are described above, may be from about 3 to about18 hours and/or from about 5 to about 10 hours and/or from about 6 to about 8 hours and/or about 7 hours.

The reaction of the urea solution and the glyoxal solution may occur at a pH of greater than 3 and/or greater than 5 and/or less than 8 and/or less than 7. Adjustment and maintenance of the pH during the reaction may be performed by adding a buffering agent or an acid or a base as appropriate to the liquid composition formed by the reaction.

In another example, a buffering agent may be added to the liquid composition comprising the DHEU to stabilize the DHEU and prevent glycoluril formation.

In yet another example, a method for making a liquid composition of the present invention comprises the step of mixing an aqueous solution of urea with an aqueous solution of glyoxal adjusted to pH 5.5 to about 6.0 with a weak basic pH adjusting agent (buffering agent) such as calcium carbonate. After mixing, the urea and glyoxal react to produce a liquid composition comprising DHEU. The pH of the liquid composition comprising DHEU is kept in a range between 5.5 and 6.5 with the weak basic pH adjusting agent. In this case, since the calcium carbonate buffering agent is a solid, it may be filtered off before using the liquid composition comprising DHEU. If this occurs, then a further buffering agent, such as TEA, may be added to the liquid composition comprising DHEU to buffer the liquid composition to a pH of between pH 6.0 to 7.5 and to stabilize the DHEU and prevent glycoluril formation post-reaction.

NON-LIMITING SYNTHESIS EXAMPLES

Example 1

In a clean and dry sealed reaction vessel of conventional construction, such as 316 SS (stainless steel) ("reactor"), a 40% by weight glyoxal aqueous solution commercially available from BASF. The pH of the aqueous glyoxal solution is adjusted to a range of between 5.5 and 6.0 using TEA. Next, 1.1 mole equivalence of urea is added to the glyoxal aqueous solution as a 40% by weight urea aqueous solution and the aqueous glyoxal/urea solution ("reaction solution") is mixed thoroughly and the reaction mixture is heated to about 40° C. to about 60° C. at a pressure of about 1 atm. The temperature of the reaction solution is increased gradually to 60° C. and maintained at that temperature for about 6 to about 8 hours at a pressure of 1 atm and the pH of the reaction solution is adjusted to between 5.8 and 6.1 and maintained at that pH for the 6 to 8 hours using TEA. The reaction solution is then cooled to 40° C. and the pH is adjusted/buffered at 7.5 with TEA. The reaction solution (liquid composition of the present invention) is diluted to 20% solid DHEU.

Example 2

In a clean and dry sealed reaction vessel of conventional construction, such as 316 SS (stainless steel) ("reactor"), a 40% by weight glyoxal aqueous solution commercially available from BASF. The pH of the aqueous glyoxal solution is adjusted to a range of between 5.5 and 6.0 using 25% calcium carbonate slurry. Next, a 40% by weight urea aqueous solution is added to the aqueous glyoxal solution and the aqueous glyoxal/urea solution ("reaction solution") is mixed thoroughly and is heated to about 40° C. to about 60° C. at a pressure of about 1 atm. The molar ratio of glyoxal to urea in the reaction solution is 1 mole glyoxal to 1.3 moles urea. The urea solution addition may cause the reaction temperature of the reaction solution (liquid composition) to drop, and some additional heat may need to be applied to the reaction solution to maintain the reaction temperature at about 40° C. to about 60° C. Once the reaction solution is completely mixed the reactor temperature is increased to 60° C. and maintained at that temperature for about 3 hours at a pressure of 1 atm and the pH of the reaction solution is adjusted to between 5.8 and 6.1 and maintained at that pH for the 3 hours using 25% calcium carbonate slurry. A sample of the reaction solution is cooled to 40° C., calcium carbonate is insoluble and therefore filtered off, and the pH of the solution is adjusted/buffered at 7.5 with TEA. Percent yield of DHEU is then determined by the HPLC Test Method described herein and calculated based on amount of glyoxal present. The percent yield of DHEU at 40° C. is greater than 30% by weight of the reaction solution as determined at a temperature of 40° C. and a pressure of 1 atm by the HPLC Test Method described herein.

The reaction solution (liquid composition of the present invention) is then cooled to 25° C. and the percent yield of DHEU is determined at a temperature of 25° C. and a pressure of 1 atm by the HPLC Test Method described herein to be up to 20% by weight of DHEU.

Example 3

In a clean and dry sealed reaction vessel of conventional construction, such as 316 SS (stainless steel) ("reactor"), a 40% by weight glyoxal aqueous solution commercially available from BASF. The pH of the aqueous glyoxal/catalyst solution is adjusted to a range of between 5.5 and 6.0 using 45% potassium hydroxide solution. Next, a 40% by weight urea aqueous solution is added to the glyoxal aqueous solution and the aqueous glyoxal/urea solution ("reaction solution") is mixed thoroughly and is heated to about 40° C. and then maintained at a reaction temperature of from about 40° C. to about 60° C. and at a pressure of about 1 atm. The molar ratio of glyoxal to urea in the reaction solution is 1 mole glyoxal to 1.3 moles urea. The urea solution addition may cause the reaction temperature of the reaction solution to drop, and some additional heat may need to be applied to the reaction solution to maintain the reaction temperature at 40-60° C. Once the reaction solution is completely mixed the reactor temperature is increased to 60° C. and maintained at that temperature for about 3 hours at a pressure of 1 atm and the pH of the reaction solution is adjusted to between 5.8 and 6.1 and maintained at that pH for the 3 hours using 45% potassium hydroxide solution. A sample of the reaction solution is cooled to 40° C. Percent yield of dihydroxyethyleneurea is then determined by the % Dihydroxyethyleneurea Test Method described herein and calculated based on amount of glyoxal present. The percent yield of dihydroxyethyleneurea at 40° C. is greater than 30% by weight of the reaction solution as determined at a temperature of 40° C. and a pressure of 1 atm by the % Dihydroxyethyleneurea Test Method described herein. The pH of the reaction solution is adjusted to between 5.8 and 6.1 and maintained at that pH for about 7 hours using TEA. The reaction solution is then cooled to 40° C. and the pH is adjusted/buffered at 7.5 with TEA. The reaction solution (liquid composition of the present invention) is diluted to 20% solid DHEU.

Comparative Examples

In a clean and dry sealed reaction vessel of conventional construction, such as 316 SS (stainless steel) ("reactor"), a 40% by weight glyoxal aqueous solution commercially available from BASF. The pH of the aqueous glyoxal solution is adjusted to a range of between 5.5 and 6.0 using phosphoric acid. Next, 1.2 mole equivalence of solid urea is added to the glyoxal aqueous solution and mixed thoroughly to dissolve the urea to form the aqueous glyoxal/urea solution ("reaction solution") and is heated to about 40° C. to about 60° C. at a pressure of about 1 atm. The temperature of the reaction solution is increased gradually to 60° C. and maintained at that temperature for about 7 hours at a pressure of 1 atm and the pH of the reaction solution is adjusted to between 5.8 and 6.1 and maintained at that pH for the 7 hours using sodium hydroxide. The reaction solution is then cooled to 40° C. The reaction solution (liquid composition of the present invention) is diluted to 20% solid DHEU. The glycoluril level in the reaction solution was measured at greater than 6000 ppm as measured according to the HPLC Test Method described herein.

Examples 4-8

In a clean and dry sealed reaction vessel of conventional construction, such as 316 SS (stainless steel) ("reactor"), is charged a 40% by weight glyoxal aqueous solution commercially available from BASF. The pH of the aqueous glyoxal solution glyoxal is adjusted to a range of between 5.5 and 6.0 using a pH adjusting agent. Then urea (either solid or a 40% solution is added to the glyoxal solution with vigorous stirring and then brought to about 40° C. Stirring is continued for the entire reaction. The molar ratio of glyoxal to urea in the reaction solution is 1 mole glyoxal to 1.1 moles urea. The urea solution addition may cause the reaction temperature of the reaction solution to drop, and some additional heat may need to be applied to the reaction solution to maintain the reaction temperature at about 40° C. to about 60° C. Once the reaction solution is completely mixed the reactor temperature is increased to 60° C. and maintained at that temperature for about 6 hours at a pressure of 1 atm. The reaction pH is kept between 5.8 and 6.1 using a pH adjusting agent. Finally the reaction is diluted to about 20% solids as determined by the Brix method described herein. The results are determined by the HPLC Test Method described herein.

Construct calibration curve using the results from the standards. Obtain slope and intercept.

ppm material=(peak area of test sample−intercept)/ slope

% by weight of material=ppm material*(test sample weight+mobile phase weight)/sample weight/ 10000

| Example | Urea Source | pH Adjusting Agent | Glycoluril (ppm) | Glyoxal (ppm) | DHEU (ppm) | Glycoluril as % on weight of DHEU | Reaction Yield of DHEU based on glyoxal (%) |
|---|---|---|---|---|---|---|---|
| Comparative | Solid | NaOH | 6065 | 1186 | 180029 | 3.37% | 98.7% |
| 4 | 40% soln | NaOH | 438 | 857 | 205000 | 0.21% | 99.2% |
| 5 | 40% soln | Na bicarbonate | 181 | 636 | 192614 | 0.09% | 99.3% |
| 6 | 40% soln | TEA | ND | 659 | 188691 | <0.01% | 99.3% |
| 7 | 40% soln | Ca carbonate | 114 | 944 | 197507 | 0.06% | 99.0% |
| 8 | 40% soln | Mg carbonate | ND | 1316 | 197180 | <0.01% | 98.7% |

ND = none detected

Test Methods

Unless otherwise specified, all tests described herein including those described under the Definitions section and the following test methods are conducted on samples that have been conditioned in a conditioned room at a temperature of 23° C.±2.2° C., a relative humidity of 50%±10% and a pressure of about 1 atm for 2 hours prior to the test. All tests are conducted in such conditioned room.

HPLC Test Method

This test is performed on liquid compositions, such as aqueous compositions and/or aqueous solutions. This test is a High Performance Liquid Chromatography ("HPLC") test. The equipment utilized is standard HPLC equipment; namely a Model 2695 Separation Module and Model 410 Differential Refractometer, both commercially available from Waters Corporation, Milford, Mass. An Alltech in-line degasser commercially available from Alltech Associates, Inc. of Deerfield, Ill. is also utilized.

After calibrating the HPLC equipment according to the manufacturers' instructions, the settings for the HPLC equipment are entered as follows.

Testing Temperature: 30° C.
Testing Pressure: 1 atm
Sensitivity: 32
Scale Factor: 20
Flow Rate: 0.5 mL/minute
Injection Volume: 100 µL
Column: Biorad HPLC Organic Acid Analysis Column, Aminex Ion Exclusion
HPX-87H 300×7.8 mm
Mobile Phase: 0.03M Phosphoric acid (HPLC grade)

Prepare 5 standards of the material to be measured in mobile phase from 150 to 4000 ppm in 5 respective autosampler vials with lids. Filter using a 0.45 Acrodisc GHP syringe filters (commercially available from VWR Scientific) before analyzing via the HPLC equipment. The material elutes at about 15 minutes.

Next, weigh 0.1 g±0.005 g of a liquid composition (or aqueous composition or aqueous solution) comprising the material to be tested into a 20 mL scintillation vial (commercially available from VWR Scientific). Take the total weight of contents of the scintillation vial to 10 g with mobile phase. Record weights. Filter using a 0.45 Acrodisc GHP syringe filter before analyzing via the HPLC equipment.

Brix Test Method

This test method, as used herein, is used to determine the total water content of a liquid composition such as an aqueous composition and/or aqueous solution.

Equipment

A Brix Tester, for example a Spectonic 0-50% Brix Tester #9002, or equivalent, is utilized for this test.

Procedure

Place 50 µL of a liquid composition to be tested on a window of the Brix Tester and then close the window cover of the Brix Tester. The Brix Tester is raised up to a convenient light source and a measurement reading is made, which is an approximate % by weight of dissolved solids within the liquid composition. The % total water content (or solvent content if materials other than water are present) in the liquid composition is then calculated by subtracting the % by weight of dissolved solids from 100%.

$^1$H NMR Test Method

Liquid compositions comprising DHEU are tested using $^1$H NMR as follows. 100 mg of DHEU aqueous solution is added to a 5-mm $^1$H NMR tube and filled to a 5-cm sample height with $D_2O$. The $^1$H Spectra are recorded at 700 MHz using 5 s delay to collect 16384 points. Integrations are determined numerically using a constant equal integration region for peaks compared. A zeroth-order baseline correction is applied, but in no case is a first-order (tilt) correction applied. Assignments for urea are done by comparative analysis of DHEU solution spectra with spectra of urea standard.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid composition produced from reacting a glyoxal aqueous solution and a urea solution such that the liquid composition exhibits a pH of greater than 5 to about 6.4 and comprises dihydroxyethyleneurea present in the liquid composition and greater than 0 to less than 4000 ppm of glycoluril present in the liquid composition as measured according to the HPLC Test Method.

2. The liquid composition according to claim 1 wherein the liquid composition comprises less than 3000 ppm of glycoluril as measured according to the HPLC Test Method.

3. The liquid composition according to claim 1 wherein the liquid composition further comprises a buffering agent.

4. The liquid composition according to claim 3 wherein the buffering agent is selected from the group consisting of: amines, hydroxides, bicarbonates, carbonates, phosphates, pH resins, and mixtures thereof.

5. The liquid composition according to claim 4 wherein the buffering agent is selected from the group consisting of: triethanolamine, sodium hydroxide, potassium hydroxide, sodium bicarbonate, calcium carbonate, magnesium carbonate, sodium phosphate, sodium hydrogen phosphate, citric acid, and mixtures thereof.

6. The liquid composition according to claim 1 wherein dihydroxyethyleneurea is present in the liquid composition at a level of greater than 5% by weight as measured according to the HPLC Test Method.

7. The liquid composition according to claim 1 wherein dihydroxyethyleneurea is present in the liquid composition at a level of up to about 50% by weight as measured according to the HPLC Test Method.

8. The liquid composition according to claim 1 wherein the liquid composition comprises less than 20% by weight of dihydroxyethyleneurea of urea as measured according to the $^1$H NMR Test Method.

9. The liquid composition according to claim 1 wherein the liquid composition comprises greater than 2% on weight of dihydroxyethyleneurea of urea as measured according to the $^1$H NMR Test Method.

* * * * *